Patented Sept. 15, 1925.

1,553,494

UNITED STATES PATENT OFFICE.

GILBERT C. BACON, OF STAMFORD, CONNECTICUT, ASSIGNOR TO ATLAS POWDER COMPANY, OF WILMINGTON, DELAWARE, A CORPORATION OF DELAWARE.

PROCESS FOR REDUCING THE VISCOSITY OF NITROCELLULOSE SOLUTIONS.

No Drawing. Application filed June 20, 1922. Serial No. 569,722.

*To all whom it may concern:*

Be it known that GILBERT C. BACON, citizen of the United States, residing at Stamford, in the county of Fairfield and State of Connecticut, has invented certain new and useful Improvements in Processes for Reducing the Viscosity of Nitrocellulose Solutions, of which the following is a specification.

This invention relates to a process of treating nitrocellulose to reduce its viscosity and to a new product resulting therefrom. This novel product is useful, among other things, in the manufacture of varnishes and lacquers, though it may be used in many of the arts and in many different ways.

In my application, Serial Number 361,544, filed February 26, 1920, I disclosed a process of treating nitrocellulose with heat or with heat and pressure in the manufacture of varnishes, lacquers and sprays consisting of a nitrocellulose solution made by dissolving the nitrocellulose in a solvent.

It is highly desirable to incorporate a large quantity of nitrocellulose in solutions of the character indicated provided the mobility of the same is not impaired. In other words, it is essential for a varnish or lacquer, whether applied with a brush or as a spray to have such low viscosity as will permit it to flow with the necessary degree of freedom. Attempts to increase the amount of nitrocellulose have ordinarily been accompanied by such an increase in viscosity as to limit the amount of nitrocellulose that it was possible to use to approximately ten ounces to the gallon of solvent. The solvent represents the expensive element of a lacquer and where the amount of nitrocellulose is small in proportion to the amount of solvent it means that many coats of the lacquer must be applied to a surface to be covered, to deposit the same thickness of nitrocellulose film that could be deposited by a few coats if a materially greater proportion of nitrocellulose were present in the lacquer. The present invention therefore relates to the production of a nitrocellulose which has had its characteristics so modified as to render it possible to materially increase the proportion of nitrocellulose in a lacquer without undue increase in the viscosity of the same.

In carrying out the invention I treat the nitrocellulose with heat, or with heat and pressure. I have found that this materially increases the solubility of the nitrocellulose rendering it readily soluble in liquids of low solvent power, which would not have constituted solvents of the same without such heating. As an example of such liquids I may mention ethyl alcohol or a mixture of ethyl alcohol and benzol. Such heating of the nitrocellulose either with or without pressure may take place in the presence of a recognized solvent of nitrocellulose, but such heating may also take place in the presence of liquids, such as ethyl alcohol or a mixture of ethyl alcohol and benzol, which are not ordinarily solvents of nitrocellulose but which in the presence of heat or heat and pressure become solvents thereof.

I have found that the heating of the nitrocellulose effects such marked changes in its characteristics as to render it possible to produce a solution containing as high as 100 ounces of nitrocellulose to the gallon of liquid with a viscosity so low as to permit of its practical use as a lacquer or spray. I have produced by this method solutions containing 100 ounces of nitrocellulose per gallon of solvent with a viscosity as low as four hundred times that of water as measured on a MacMichael viscosimeter at 25° C.

It will be observed that by virtue of my discovery I am able to employ as solvents of nitrocellulose, liquids not commonly recognized as solvents thereof and since the cost of these liquids is very low in comparison with the cost of the solvents heretofore necessarily employed, I am able to effect a marked reduction in the cost of manufacture of lacquers and varnishes as well as to improve the quality of the same.

It is to be understood that I do not wish to limit myself as to the particular degree of pressure or temperature employed since these will vary with the liquid vehicle used or with the degree of concentration desired, or both. The heating may be within very wide ranges i. e. anywhere between 60° C. and the temperature at which the material treated decomposes and the pressure, if pressure exists, corresponding to the vapor pressure of the liquid at the temperature used.

I do not claim the heating of nitrocellulose in the presence of an acid for this is disclosed in the British patent to Chandelon 11,941 of 1911, but claim only the heating of nitrocellulose in non acid solutions or liquids (when any liquid at all is employed) or the mere heating without any liquid whatever, as for example, by heating in a substantially dry state in any ordinary oven. If heated in an oven without any liquid I may, if desired, embed the nitrocellulose in and cover it with a heat retaining and transmitting material of a granular or powdery nature, such as sand to reduce danger of ignition or explosion of the nitrocellulose.

The present invention is susceptible of use with a wide range of nitrocellulose products including the newly nitrated cotton, celluloid and cellulose scrap, smokeless powder, etc., it being manifest that the particular nitrocellulose material employed does not constitute a feature of invention but that I am entitled to the use of my process upon any suitable material of this nature which I find to be commercially available. Ordinarily, the pressure would vary with the temperature employed, as before stated but I may heat the nitrocellulose in the presence of a liquid, solvent or non solvent containing as an element some ingredient (such as amyl acetate for example) which will raise the boiling point of the solution. Under these conditions increased temperature can be secured without increase of pressure. This may be advantageous where it is desired to heat the material in open vats rather than in sealed kettles. It is common practice in the art to which this invention relates to vary the solvents employed and to mix and intermix them in widely varying combinations and proportions to suit the needs of any particular case. Therefore, it is a mere matter of choice for me to combine with a solution made by heating nitrocellulose in the presence of a liquid of low solvent power, such additional solvent or solvents as may be desired. For example, I may heat the nitrocellulose in the presence of ethyl alcohol or a mixture of ethyl alcohol and benzol or other suitable liquid of low solvent power and of an inexpensive nature and by such heating desirably reduce the viscosity of the nitrocellulose and thereafter add other solvent materials of a higher grade and possibly of a more expensive nature, such as amyl acetate.

Another advantage flowing from the increase of the boiling point of the liquid in which the nitrocellulose is heated is that of increased safety where the nitrocellulose used is of a highly explosive nature. For example, great quantities of smokeless powder are at present available at scrap prices. By my process this material may be safely worked in the production of the commercial nitrocellulose solutions above referred to and by increasing the boiling point of the liquid solvent or non solvent in which the smokeless powder is heated I can secure higher temperatures without pressure it being well known that smokeless powder does not become explosive until confined. At atmospheric pressure it will burn but will not explode. Thus by avoiding the generation of pressure along with the increased temperature the factor of safety is greatly increased.

Where the liquid in which the nitrocellulose is heated gives off vapors of value I may withdraw the vapors as fast as generated thus serving the double purpose of recovering the valuable vapors to be afterward condensed and of preventing the generation of pressure when the nature of the nitrocellulose is such as to render that desirable, as in the case of smokeless powder, for example.

Having described my invention, what I claim is:

1. The herein described process for treating nitrocellulose to reduce the viscosity of the same in the manufacture of commercial nitrocellulose solutions which consists of subjecting the nitrocellulose to heat in the presence of a liquid of low solvent power said nitrocellulose being rendered soluble in such liquid by the heating and such liquid remaining in combination with the nitrocellulose to make a commercial nitrocellulose solution.

2. The herein described process for treating nitrocellulose to reduce the viscosity of the same in the manufacture of commercial nitrocellulose solutions which consists of subjecting the nitrocellulose to heat in the presence of a liquid of low solvent power and thereafter adding to the nitrocellulose an additional liquid of greater solvent power constituting a recognized solvent of nitrocellulose, the first named liquid remaining in combination with the nitrocellulose and constituting a part of the liquid vehicle of the nitrocellulose solution.

3. The herein described process of preparing commercial nitrocellulose solutions which consist of adding a liquid of low solvent power containing ethyl alcohol to the nitrocellulose and subjecting the whole to the action of heat to render the nitrocellulose soluble in the ethyl alcohol, the ethyl alcohol remaining in combination with the nitrocellulose and constituting the liquid vehicle of the completed nitrocellulose solution.

4. The herein described process of preparing commercial nitrocellulose solutions which consist of adding ethyl alcohol and benzol to the nitrocellulose and subjecting the whole to the action of heat to render the nitrocellulose soluble in the ethyl alcohol and benzol to thereby form a commercial nitrocellulose solution of which the ethyl alcohol and benzol constitute the liquid vehicle for the nitrocellulose.

5. The herein described process of preparing commercial nitrocellulose solutions which consist of subjecting a gelatinated cellulose ester product to the action of heat to render it soluble in ethyl alcohol and benzol and then adding ethyl alcohol and benzol to such cellulose ester product to make a nitrocellulose solution suitable for use as a lacquer or varnish.

6. The herein described process for treating nitrocellulose to reduce the viscosity of the same in the manufacture of commercial nitrocellulose solutions, which consists of subjecting said nitrocellulose to heat in the presence of a liquid not a satisfactory solvent of nitrocellulose until the viscosity of the latter is reduced below normal, and subjecting said liquid and nitrocellulose to heat to a degree to reduce the viscosity of the nitrocellulose and render it more solvent in said liquid, said liquid remaining in combination with the nitrocellulose and constituting the liquid vehicle of the resultant commercial solution.

In testimony whereof he affixes his signature.

GILBERT C. BACON.